United States Patent [19]

Coassolo et al.

[11] Patent Number: 4,923,947
[45] Date of Patent: May 8, 1990

[54] THERMOTROPIC LIQUID CRYSTALLINE AROMATIC POLYESTERS OF DISUBSTITUTED 4,4′-DIHYDROXYDIPHENYLENE

[75] Inventors: Alfredo Coassolo, Novara; Giampiero Sabarino, Vercelli; Marco Foá, Novara; Larry L. Chapoy, Lesa, all of Italy

[73] Assignee: Montedison S.p.A., Milan, Italy

[21] Appl. No.: 296,072

[22] Filed: Jan. 12, 1989

[30] Foreign Application Priority Data

Jan. 12, 1988 [IT] Italy .............................. 19038 A/88

[51] Int. Cl.$^5$ ........................................... C08G 63/02
[52] U.S. Cl. ................................... 528/193; 528/176; 528/190; 528/191; 528/192
[58] Field of Search ............... 528/176, 190, 191, 192, 528/193

[56] References Cited

U.S. PATENT DOCUMENTS 4,230,817 10/1980 Charbonneau ...................... 528/192
4,654,412  3/1987 Calundann et al. ................. 528/192

*Primary Examiner*—Harold D. Anderson
*Assistant Examiner*—T. Mosley
*Attorney, Agent, or Firm*—Stevens, Davis, Miller & Mosher

[57] ABSTRACT

Thermotropic liquid crystalline aromatic polyesters of 4,4′-dihydroxydiphenyl substituted in 3,3′ positions by a halogen or by an alkyl, cycloalkyl or aralkyl radical.

13 Claims, No Drawings

THERMOTROPIC LIQUID CRYSTALLINE AROMATIC POLYESTERS OF DISUBSTITUTED 4,4'-DIHYDROXYDIPHENYLENE

BACKGROUND OF THE INVENTION

The present invention relates to thermotropic liquid crystalline aromatic polyesters.

More particularly, the present invention relates to thermotropic liquid crystalline aromatic polyesters easily processable in the molten state and having the mesogen group in the main chain.

Thermotropic polyesters showing optical anisotropy in the molten state are known products and are described in many examples in literature such as British Polymer Journal (December 1980), page 154: "Liquid Crystal Polymer"; Journal of Macromolecular Science-Chemistry (1984), page 1705: "Liquid Crystalline Aromatic Polyesters"; Die Angewandte Makromolekulare Chemie (1982), 109–110 page 1 "Rigid Chain Polymers"; Die Angewandte Makromolekulare Chemie (1986), 145–146, page 231: "Thermotropic Liquid Crystalline Polymers"; Journal of Molecular Science Review (1986) C26(4), page 551; "Liquid Crystalline Polymers: a novel state of material".

The use of these polyesters allows one to obtain fine fibers exhibiting high thoughness or molded manufactured articles, for instance those articles obtained by injection molding, having suitable rigidity, hardness and toughness.

Generally, the polymers endowed with the above mentioned characteristics are easily processable in the molten state, highly resistant to heat and oxidation and furthermore, because of their crystallinity, these polymers show high HDT (Heat Distortion Temperature) and resistance to solvents.

The foregoing polymers can be obtained by polycondensation for example, of terephthalic acid and a 4,4'-dihydroxydiphenyl melt but at temperatures too high to be easily processed. Methods used to lower the melting point suggest using more substituents on the aromatic rings of diphenol or of terephthalic acid or by modifying the polymer by the addition of other comonomers.

U.S. Pat. No. 3,637,595 describes the preparation of thermotropic liquid crystalline polyesters by polycondensation of 4,4'-dihydroxydiphenyl, terephthalic acid and p-hydroxybenzoic acid. The thus obtained polymer, although exhibiting high mechanical characteristics and resistance to oxidation and solvents, possesses a high melting point, higher than 420° C. and therefore it is processable only with difficulty or, at any rate, requires unconventional apparatus when injection molding the polymer.

In U.S. Pat. No. 3,975,487 the above mentioned drawback has been partially overcome by using bent comonomers, such as isophthalic acid, the presence of which however, if in high quantities, can cause the destruction of the liquid crystalline properties of the finished polymer.

In Journal of Polymer Science : Polymer Physic Edition vol 21, 119, the preparation of polyesters starting from 4,4'-dihydroxydiphenyl and different aliphatic diacids is described; however, these polymers, because of the presence of compounds with aliphatic chain, exhibit little interesting physicomechanical properties.

U.S. Pat. No. 4,617,370 describes the preparation of liquid crystalline polymers starting from 4,4'-dihydroxydiphenyl substituted in the 3,3', 5,5' positions by phenyl or alkyl or alkoxy radicals containing a lower number of carbon atoms and substituted in at least one of the positions 2,2',6,6' by a halogen atom.

This monomeric unit is allowed to react with dicarboxylic aromatic acids and the polymer thus obtained has a melting point in the range between 270° and 250° C.

However, according to what is described in this patent, it is possible to obtain a polymer endowed with liquid crystalline properties only if the hydroxyaromatic acid is used in the polymerization mixture, otherwise the polymer obtained shows an isotropic molten state.

In European Pat. Appln. No. 201,831 thermotropic liquid crystalline polyesters, obtained by polycondensation of a bicarboxylic aromatic acid of 4,4'-dihydroxyphenyl can be used for the preparation of thermotropic liquid crystalline polyesters either in the non-substituted form together with other comonomers, or in the substituted form selecting suitable substituent groups.

SUMMARY OF THE INVENTION

The Applicants' have now found that polyesters obtained by starting from 4,4'-dihydroxydiphenyl substituted in the positions 3,3' by halogen atoms or by alkyl or aralkyl radicals are thermotropic liquid crystalline polyesters.

OBJECTS OF THE INVENTION

It is an object of the present invention to provide a thermotropic liquid crystalline aromatic polyesters comprising:

(a) at least one unit derived from essentially disubstituted diphenols of the general formula:

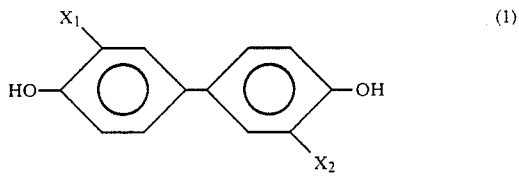

wherein $X_1$ and $X_2$, which can be the same or different, represent a halogen or an alkyl radical having from 1 to 6 carbon atoms, an aralkyl radical containing at least 7 carbon atoms, preferably from 7 to 15 carbon atoms, or a cycloalkyl radical containing from 6 to 12 carbon atoms;

(b) at least one unit derived from dicarboxylic acids of the general formula $$HOOC-R_1-COOH \qquad (2)$$

wherein $R_1$ represents a cycloalkyl radical, a simple, double or condensed aryl radical containing from 6 to 18 carbon atoms, optionally substituted by groups inert under the reaction conditions such as halogens or alkyl radicals having a low number of carbon atoms;

(c) optionally at least one unit derived from hydroxyacids of the general formula:

$$HO-Ar_1-(CH=CH)_n-COOH \qquad (3)$$

wherein $Ar_1$ represents a simple, double or condensed aryl radical containing from 6 to 18 carbon atoms, optionally substituted by groups inert under the reaction conditions such as halogens or alkyl radicals having a low number of carbon atoms and n is zero or 1;

(d) optionally at least one unit derived from diphenols of general formula:

HO—Ar$_2$—OH  (4)

wherein Ar$_2$ represents a simple or condensed aryl radical containing from 6 to 18 carbon atoms, optionally substituted by at least one radical X$_1$ or X$_2$ as previously defined; and (e) optionally at least one unit derived from diphenols of general formula:

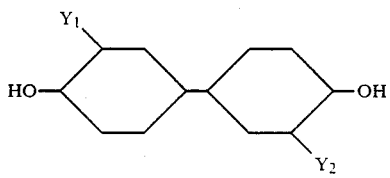

(5)

wherein Y$_1$ and Y$_2$ which can be the same or different, represent a hydrogen atom or an aryl radical containing from 6 to 12 carbon atoms.

By the term "alkyl radicals having a low number of carbon atoms" as used in the present description and in claims, alkyl radicals containing from 1 to 4 carbon atoms are meant.

DETAILED DESCRIPTION OF THE INVENTION

According to a preferred embodiment of the polyesters of the present invention, diphenols of item (a) are essentially disubstituted; however, mixtures containing mono-substituted derivatives can be also used.

In the mixtures the content of mono-substituted diphenol can vary within wide limits; however, mixtures containing up to 50% by mol of mono-substitued derivatives are those more commonly used.

According to a further preferred embodiment of the polyesters of the present invention at least 90% by mol of products of general formula (2), (3) and (4) have two functional groups so as to form a polymeric chain with substantially coaxial or parallel direction.

Examples of substituted diphenols of the general formula (1) are 3,3'-dichloro-4,4'-dihydroxydiphenyl, 3,3'-dibromo-4,4'-dihydroxydiphenyl, 3,3'-dimethyl-4,4'-dihydroxydiphenyl, 3,3'-diethyl-4,4'-dihydroxydiphenyl, 3,3'-di-t.buthyl-4,4'-dihydroxydiphenyl, 3,3'-dicyclohexyl-4,4'-dihydroxydiphenyl, 3,3'-diphenylethyl-4,4'-dihydroxydiphenyl, 3,3'-di(1-methyl-1-phenylethyl)-4,4'-dihydroxydiphenyl, etc.

Examples of hydroxyacids of the general formula (3) are p-hydroxybenzoic acid, 3-chloro-4-hydroxybenzoic acid, 3-bromo-4-hydroxybenzoic acid, 3,5-dichloro-4-hydroxybenzoic acid, 3-methyl-4-hydroxybenzoic acid, 3-t.butyl-4-hydroxybenzoic acid, 4-hydroxy-1-naphthoic acid, 6-hydroxy-2-naphthoic acid, p-(4-hydroxyphenyl)-benzoic acid, p-hydroxycinnamic acid, etc.

Examples of aromatic diols of the general formula (4) are hydroquinone, the methyl, ethyl, propyl, t.butyl hydroquinones, phenylhydroquinone, (1-phenylethyl)-hydroquinone, 2,5-bis(phenylethyl)hydroquinone 2,5-bis(alfaphenylisopropyl) hydroquinone, cyclohexylhydroquinone, 2,6-dihydroxynaphthalene, etc.

Examples of diphenols of the general formula (5) are 4,4'-dihydroxydiphenyl, 3,3'-diphenyl-4,4'dihydroxydiphenyl, phenyl-4,4'-dihydroxydiphenyl, etc.

In the thermotropic liquid crystalline aromatic polyesters of the present invention, the units derived from diphenols of items (d) and (e) are in molar ratios d:a and e:a with the units derived from diphenols of item (a), in the range between 0 and 1, whilst the units derived from the hydroxyacids of item (c) are in molar ratios c:b, with the units derived from the acids of item (b), in the range between 0 and 4.

The polymers of the present invention are optically aninotropic in the molten state, as it can be verified by the analysis in optical microscopy under polarized light, and have inherent viscosity, generally measured in a 1:1 mixture of trifluoroacetic acid and methylene chloride at 30° C. at a concentration of 2.5 g/liter, comprised between 0.3 and 4 dl/g.

Alternatively, other solvents, such as for instance, pentafluorophenol at 60° C. can be used.

The melting temperature may vary within wide limits according to the composition of the polymer and the degree of polymerization; generally, this temperature is in the range between 200° and 400° C.

The molecular weight and the crystallinity can be increased by heating the polymer particles under inert atmosphere or in vacuo at a temperature just below the melting point for a time varying between 1 and 20 hours.

The polyesters of the present invention may be used for obtaining shaped articles which may be produced by means of ordinary thermoplastic polymer processing techniques such as, for instance, injection or extrusion molding. Also they can be processed in film or fiber form, and may be used as matrices for composite materials containing fibers or inorganic fillers and may be used as a mixture with other polymers.

The preparation of the liquid crystalline polyesters of the present invention can be performed according to conventional techniques by allowing the above mentioned units to react. The above mentioned units are available on the market or can be easily prepared by common techniques of organic chemistry, under the generally used conditions for the preparation of the polyester resins.

For instance, the above mentioned polyesters can be obtained in the molten state or in the presence of a dispersing agent, having a high boiling point, such as diphenylsulphone or mixtures of partially hydrogenated terphenyls, by transesterification between the bicarboxylic aromatic acids and the acetates or propionates of phenols and optionally of the hydroxyacids, at temperatures in the range between 270° and 370° C. in such a manner as to favor complete evolution of the aliphatic carboxylic acids by working under vacuum.

The reaction can optionally be carried out in the presence of a transesterification catalyst, such as, for instance, phosphates of alkaline or earth-alkaline metals.

Further catalysts can be those generally used in polycondensation processes and described in "Encyclopedia of Polymer Science and Technology" (1969, vol. 10, page 722-723).

Examples of these catalysts are the oxides, hydroxides, hydrides, halides, alcoholates or phenolates, salts and complex salts of organic or inorganic acids of lithium, sodium, potassium, magnesium, calcium, titanium, manganese, cobalt, zinc, tin, antimony, lanthanum, cerium, lead and germanium.

The required quantity of the catalyst is between 0.005 and 1% by mol and preferably in the range between 0.01 and 0.2% by mol, calculated on the total quantity of the reagents.

According to an alternative method, the liquid crystalline polyesters of the present invention can be obtained in solution, by polycondensation between the halides of the bicarboxylic aromatic acids and the mixture of phenols in a suitable solvent. The temperature is in the range between 25° and 220° C. and the reaction is carried out in the presence of a nitrogen flow to favor the removal of the halogenidric acid.

Among the solvents, pyridine is especially preferred, whilst chlorinated solvents, either aliphatic or aromatic, such as methylene chloride, chlorobenzene, dichlorobenzenes and trichlorobenzenes are also preferred.

The thus obtained polymer is then recovered by evaporation of the solvent or by precipitation by a nonsolvent and subsequent filtration.

In order to better understand and put into practice the present invention, some illustrative but not limitative examples are given hereinbelow.

EXAMPLE 1

Into a 4-necked, 250 ml glass round-bottomed flask, provided with mechanical agitator, cooler and inlet pipe for nitrogen, 2.65 g (13.05 mM) of dichloride of terephthalic acid, 5.14 g (13.05 mM) of 3,3'di(phenylethyl)-4,4'-dihydroxydiphenyl and 80 ml of 1,2,4-trichlorobenzene are introduced under nitrogen stream.

The reaction mixture is kept under agitation and nitrogen flow for 20 minutes at room temperature and thereafter the temperature is raised to 220° C.

The whole is kept at this temperature for further 18 hours until the release of HCl is practically completed.

The reaction mixture is allowed to cool while keeping the agitation and the nitrogen flow.

When the reaction mixture has reached 50° C., the gelatinous mass is poured in acetone and the formed precipitate is filtered off.

The thus obtained polymer is washed with acetone (twice), with hot water (twice) and acetone/methanol(twice).

The final product is dried under vacuum for 3 hours at 190° C.

The dried polymer has a melting temperature (Tm) of 313° C. and a crystallization temperature (Tc) of 282° C. (the melting and crystallization temperatures are measured by D.S.C. (Differential Scanning Calorimetry-) with a scanning of 20° C./minute for the Tm and of 10° C. minute for the Tc).

The inherent viscosity is 1.25 dl/g (measured at 30° C. in a solvent consisting of equal volume of trifluoroacetic acid and methylene chloride at the concentration of 2.5 g/liter).

The molten polymer is optically anisotropic at the microscope under polarized light.

EXAMPLE 2

Into a 4-necked 250 ml glass round-bottomed flask provided with mechanical agitator, cooler, inlet pipe for the nitrogen, 2.62 g (12.90 mM) of dichloride of the terphthalic acid, 5.44 g (12.90 mM) of 3,3'-di(1-methyl-1-phenylethyl)-4,-4'-dihydroxydiphenyl and 85 ml of 1,2,4-trichlorobenzene are introduced under nitrogen flow.

The mixture is kept under agitation and nitrogen flow for 20 minutes at room temperature and thereafter the temperature is raised to 220° C.

The whole is kept at this temperature for 18 hours until the release of HCl is practically complete.

The mixture is allowed to cool always under agitation and nitrogen flow.

When the reaction mixture has reached 50° C., the gelatinous mass is poured in acetone and the precipitate thus formed is filtered off.

The thus obtained polymer is washed with acetone (twice), with hot water (twice) and acetone/methanol (twice).

The final product is dried under vacuum for 3 hours at 190° C.

The dried polymer has an inherent viscosity of 0.70 dl/g (measured in pentafluorophenol at 60° C. and at the concentration of 2.5 g/liter) and a crystallinity of 47% by volume.

The polymer, after having been heated again for 6 hours at 310°–320° C., when observed at the microscope under polarized light equipped with heating plate, is optically anisotropic over the melting temperature (Tm) of 390° C.

EXAMPLE 3

Into a 4-necked 100 ml glass round-bottomed flask, provided with mechanical agitator, inlet pipe for the nitrogen 4.23 g (30.62 mM) of p-hydroxybenzoic acid, 2.54 g (15.29 mM) of terephthalic acid, 6.02 (15.29 mM) of 3,3'-diphenylethyl-4,4'-dihydroxydiphenyl, 0.30 g of trisodium phosphate dodecehydrate, 8 g of acetic anhydride and 20 g of diphenylsulfone are introduced under slight nitrogen flow.

While keeping a slight nitrogen flow and under agitation, the reaction mixture is heated up to 140° C. by means of a silicone oil bath for high temperatures.

The reaction mixture is kept at this temperature for 1 hour and acetic acid begins to distillate.

The temperature is then raised to 240° C. and ketp for a further hour.

The temperature of the oil bath is raised to 270° C. and kept for 40 minutes, to 300° C. for 30 minutes and finally to 310° C. for 1 hour and 30 minutes.

At the end of the polymerization reaction, after having cooled to room temperature always under a slight nitrogen flow, the solid mass which is obtained is finely milled.

The thus obtained powder is washed twice with acetone, twice with hot water and twice with acetone/methanol.

The final product is dried under vacuum for 3 hours at 140° C.

The thus obtained polymer is amorphous, has a Tg (glass transition temperature) of 122° C. and an inherent viscosity of 1.60 dl/g (measured at 30° C. in a solvent consisting of equal volume of trifluoroacetic acid and methylene chloride at the concentration of 2.5 g/liter).

The polymer when examined at the polarized light microscope provided with heating plate appears optically anisotropic in the fluid state.

What is claimed is:

1. A thermotropic liquid crystalline aromatic polyester comprising:
   (a) at least one unit derived from an essentially bisubstituted diphenol of the formula:

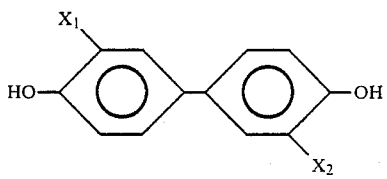

wherein $X_1$ and $X_2$, which are the same or different, represent halogen or an alkyl radical containing from 1 to 6 carbon atoms, an aralkyl radical containing at least 7 carbon atoms, or a cycloalkyl radical containing from 6 to 12 carbon atoms;

(b) at least one unit derived from a bicarboxylic acid of the formula:

HOOC—$R_1$—COOH  (2)

where $R_1$ represents a cycloalkylene radical, a simple, double or condensed arylene radical containing from 6 to 18 carbon atoms unsubstituted or substituted by groups inert under the reaction conditions selected from the group consisting of halogen and alkyl radicals containing a low number of carbon atoms;

(c) optionally in the presence of at least one unit derived from a a hydroxyacid of the formula:

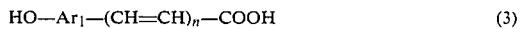

HO—$Ar_1$—(CH=CH)$_n$—COOH  (3)

wherein $Ar_1$ represents a simple, double or condensed arylene radical containing from 6 to 18 carbon atoms unsubstituted or substituted by groups inert under the reaction conditions selected from the group consisting of halogen and alkyl radicals containing a low number of carbon atoms and n is zero or 1;

(d) optionally in the presence of at least one unit derived from a diphenol of the formula:

HO—$AR_2$—OH  (4)

wherein $Ar_2$ represents a simple or condensed arylene radical containing from 6 to 18 carbon atoms, unsubstituted or substituted by at least one radical $X_1$ or $X_2$; as previously defined and (e) optionally in the presence of at least one unit derived from a diphenol of the formula:

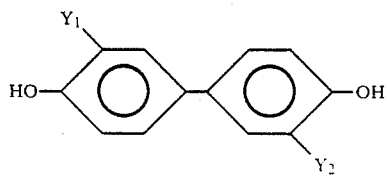

wherein $Y_1$ and $Y_2$, which are the same or different, are hydrogen or an aryl radical containing from 6 to 12 carbon atoms.

2. Polyester according to claim 1, wherein the diphenols of item (a) are in mixture with the corresponding monosubstituted derivatives.

3. Polyester according to claim 2, wherein the monosubstituted derivatives are contained in mixture in quantity up to 50% by mols.

4. Polyester according to claim 1, wherein at least 90% by mol of the products of formula (2), (3) and (4) have two functional groups so as to form the polymeric chain in substantially coaxial or parallel direction.

5. Polyesters according to claim 1, wherein the diphenols of the general formula (1) are selected from the group consisting of 3,3'-dichloro-4,4'-dihydroxydiphenyl, 3,3'-dibromo-4,4'-dihydroxydiphenyl, 3,3'-dimethy-4,4'-dihydroxydiphenyl, 3,3'-diethyl-4,4'-dihydroxydiphenyl, 3,3'-di-t.buthyl-4,4'-dihydroxydiphenyl, 3,3'-dicyclohexyl-4,4'-dihydroxydiphenyl, 3,3'-diphenylethyl-4,4'-dihydroxydiphenyl and 3,3'-di(1-methyl-1-phenylethyl)-4,4'-dihydroxydiphenyl.

6. Polyesters according to claim 1, wherein the bicarboxylic aromatic acids of the general formula (2) are selected from the group consisting of terphthalic acid, the chloro, bromo-terophthalic acids, methylterephthalic acid, the 1,4-naphthalenbicarboxylic, 1,5-naphthalenbicarboxylic and 2,6-naphthalenbicarboxylic acids, 4,4'-diphenylbicarboxylic acid, 3,3'-dibromo-4,4'-diphenylbicarboxylic acid, and 4,4'-stilbenebicarboxylic acid.

7. Polyester according to claim 1, wherein the hydroxyacids of the general formula (3) are selected from the group consisting of p-hydroxybenzoic acid, 3-chloro-4-hydroxybenzoic acid, 3-bromo-4-hydroxybenzoic acid, 3,5-dichloro-4-hydroxybenzoic acid, 3-methyl-4-hydroxybenzoic acid, 3-t.buthyl-4-hydroxybenzoic acid, 4-hydroxy-1-naphthoic acid, 6-hydroxy-2-naphthoic acid, p-(4-hydroxyphenyl)benzoic acid and p-hydroxycinnamic acid.

8. Polyester according to claim 1, wherein the aromatic diols of the general formula (4) are selected from the group consisting of hydroquinone, the methyl, ethyl, propyl, t-butyl hydroquinones, phenyl hydroquinone, (1-phenylethyl)hydroquinone, 2,5-bis(phenylethyl hydroquinone, 2-(alfa-phenylisopropyl)hydroquinone, 2,5-bis(alfaphenylisopropyl)hydroquinone, cyclohexylhydroquinone and 2,6-dihydroxynaphthalene.

9. Polyester according to claim 1, wherein diphenols of the formula (5) are selected from the group consisting of 4,4'-dihydroxydiphenyl, 3,3'-diphenyl-4,4'-dihydroxydiphenyl, phenyl-4,4'-dihydroxyphenyl.

10. Polyester according to claim 1, wherein the units derived from phenols of items (d) and (e) are in molar ratios d:a and e:a, with the units derived from diphenols of item (a), in the range between 0 and 1, whilst the units derived from the hydroxyacids of item (c) are in molar ratios c:b, with the units derived from the acids of item (b), in the range between 0 and 4.

11. Polyester according to claim 1, having inherent viscosity, measured in a 1:1 mixture of trifluoroacetic acid and methylene chloride at 30° C. at a concentration of 2.5 g/liter, in the ragne between 0.3 and 4 dl/g and a melting temperature in the range between 200° and 400° C.

12. Polyester according to claim 1, wherein the aralkyl radical containing at least 7 carbon atoms contains 7 to 15 carbon atoms.

13. A fiber film shaped article or matrix of the polyester of any one of the preceding claims.

* * * * *